May 11, 1971　　　　　　　L. L. GELB　　　　　　　3,578,489

RESIN COATED FILAMENTARY MATERIAL

Filed Nov. 13, 1968

LEONARD L. GELB
*INVENTOR.*

BY S. Grant Stewart

ATTORNEY

3,578,489
RESIN COATED FILAMENTARY MATERIAL
Leonard L. Gelb, Cumberland, Md., assignor to Hercules Incorporated, Wilmington, Del.
Filed Nov. 13, 1968, Ser. No. 775,254
Int. Cl. B44d *1/42;* H01b *3/36;* B32b *27/12*
U.S. Cl. 117—128.4    16 Claims

ABSTRACT OF THE DISCLOSURE

The invention provides (1) boron filament coated with a phenolic-polyvinyl acetal resin as a medium for bonding the filament to an epoxy type matrix material, (2) process for manufacture of the above coated boron filaments involving contact of bare boron filaments with a solution of said resins to wet the filament, regulating thickness of the resulting solution layer to provide the residual resin coating sought, removing solvent from the wetting layer, and partially curing residual solid resin as the resin coating, (3) broad goods comprising mat product of filamentary winding of the above described resin coated boron filaments, (4) method for forming a specific coating solution for the bare filaments, involving forming a separate solution of each of the resins in predetermined resin proportions and concentrations, and then admixing the two separate solutions to form the product solution and (5) resulting coating solution of 5–20 weight percent total resin content, in a phenolic resin to polyvinyl acetal resin weight ratio of from about 0.25:1 to 18:1.

---

Figure 1:
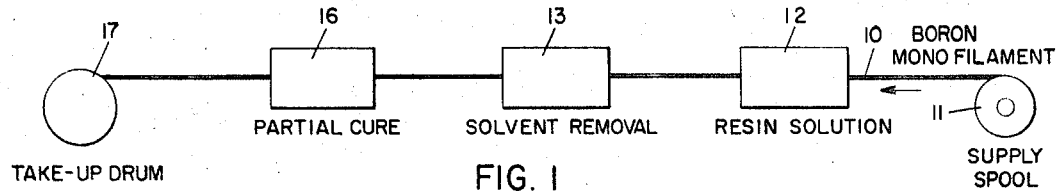

This invention relates to boron monofilaments coated with a mixture of resin materials as a medium for bonding said filaments to an epoxy type matrix material. In one aspect this invention relates to a method for the manufacture of the above described coated filaments. In still another aspect this invention relates to broad goods of improved physical characteristics made from coated monofilaments and epoxy matrix materials, above described. Other aspects will be apparent in light of the accompanying disclosure and the appended claims.

Boron monofilaments have been found to exhibit high modulus characteristics especially suitable for their use as filament materials in broad goods, by which term it is meant sheet product of filament winding, or laminates thereof, as a "mat," formed by laying down filaments in unidirectional and parallel relationship in a suitable matrix of bonding material. In numerous, if not the majority of, instances, the matrix bonding material is of the epoxide resin type and hence and most applications of boron filaments to manufacture of broad goods are associated with epoxy type matrices.

However, boron monofilaments are unsuitably bondable to epoxy matrix materials, and the result of such poor bonding is a deficiency in shear strength and fatigue resistance of the resulting filament winding product. Attempts to effect proper bonding action of boron monofilaments to epoxy matrix materials have included etching the boron filament with acid, vapor deposition on the filament of substances with functional groups and immersion of the filament in chemicals, all with the objective of making the surface more amenable to bonding with the epoxy resin matrix. However, none of these routes have been successful.

Further, the requirement for uniformity of spacing of the separate monofilaments, in filament winding on a mandrel, necessitates close machine control which at best is subject to error and hence is a least desirable route to the finished product. Errors inherent in machine controlled filament spacing, above described, lead to disorganized filament patterns including void spaces and overlaps with accompanying frictional wear and local stress concentration points, and hence overall deficiency in proper load transfer.

The invention is based on the discovery that boron monofilaments can be bonded with a partially cured acetal-phenolic resin coating material and in that form are strongly bondable to epoxy type matrices, in the manufacture of filament windings. The invention is further concerned with filaments, coated as described, with a method for coating same, and with broad goods formed from windings of the above described coated filaments.

In accordance with the invention, a filamentary material is provided which comprises a boron filament, and a resin material uniformly, and completely, covering said filament as a coating therefor; said resin material consisting essentially of a mixture of a phenolic resin and a polyvinyl acetal resin in a weight ratio of said phenolic to said acetal within the range of from 0.25:1 to 18:1, and bonded to said filament in a state of partial cure. Further in accordance with the invention a process is provided for the manufacture of boron filaments exhibiting improved bondability to matrices of the epoxy resin type, comprising contacting a boron filament with a solvent solution of phenolic resin and polyvinyl acetal resin containing said phenolic in a weight ratio to said acetal within the range of from about 0.25:1 to 18:1, to wet said filament in its entirety with said solution; removing said filament from contact with said solution, and said filament thus removed being completely covered with a layer of said solution; adjusting the thickness of said solution layer on said filament, to a predetermined, substantially constant value; subjecting the resulting layer-covered filament to conditions for substantially completely removing solvent from said layer; and curing residual resin of said layer to a sufficiently partial degree to bond said residual resin to said filament as a solid coating therefor.

Further in accordance with the invention a method is provided for the manufacture of broad goods, which comprises winding a plurality of boron monofilaments into a matrix of an epoxy type resin, on a mandrel, in unidirectional, uniplanular and parallel mat form; each said boron filment being completely covered with a resin coating of substantially the same and uniform thickness; said resin consisting essentially of a mixture of phenolic resin and polyvinyl acetal resin, in a phenolic to acetal weight ratio of from 0.25:1 to 18:1, bonded to said filament by a partial degree of cure; and then curing resulting mat product sufficiently to bond each said coating to said matrix.

Still further in accordance with the invention a broad goods is provided which comprises a winding of a plurality of boron monofilaments, in unidirectional, uniplanular and parallel mat form relationship, within a matrix of the epoxy resin type; each said boron filament being completely covered with a resin coating of substantially the same and uniform thickness; each of said resin coating consisting essentially of a mixture of phenolic resin and polyvinyl acetal resin, in a phenolic to acetal weight ratio of from 0.25:1 to 18:1, and bonded to its respective filament and to said matrix in a partial degree of cure.

The resin coating material serves to chemically bond the boron filament to the epoxy type matrix. Without the resin medium, the boron filament to epoxy matrix bond is weak. When the resin coating is formed of a phenolic resin alone, the boron filament is strongly bonded to the coating but the latter is weakly bonded, if at all, to the epoxy matrix. On the other hand, when the resin coating is formed of a polyvinyl acetal alone, the coating is strongly bonded to the epoxide matrix but weakly bonded to the filament. I have found that under curing conditions described herein, i.e. for effecting partial cure of the resin coating on the boron filament and further cure of the epoxy matrix and boron filament winding therein, there is not only a firm bond of phenolic resin to boron filament, and of acetal resin to epoxy resin matrix, but there is also a reaction of the phenolic and acetal resins to liberate an alcohol and to convert the polyvinyl acetal-phenolic resin mixture to a chemically united system, one end of which bonds to the boron filament surface and the other to the epoxy matrix resin.

Although any suitable polyvinyl acetal can be utilized in the formation of a resin coating in practice of the invention, those in which the aldehyde portion of the molecule are formed from aldehydes containing from one to five carbon atoms are now preferred, viz., polyvinyl formal, polyvinyl acetal, polyvinyl propional, polyvinyl butyral and polyvinyl valeral. Further exemplary of polyvinyl acetal resin components are polyvinyl glyoxal, polyvinyl benzal, polyvinyl crotonal, polyvinyl heptanal, polyvinyl trimethyl acetal, and polyvinyl trichloro acetal.

Exemplary phenolic resins are those formed from a phenol containing from one to three hydroxys in the molecule with from 0 to 2 or more ring substitutents in addition to the hydroxy group, and an aldehyde containing from one to four carbon atoms in the molecule. Thus, the phenolic resins include those formed from an aldehyde such as formaldehyde, acetaldehyde, propionaldehyde or butyraldehyde, and a phenol such as resorcinol, catechol, hydroquinone, phloroglucinol, cresol, o-nitrophenol, o-chlorophenol and p-bromophenol. Generally the phenolic resin is formed from phenol (monohydroxybenzene) and an aldehyde above described, preferably formaldehyde. Now preferred are phenol-formaldehyde resins of the novolak-type often formed in a ratio of phenol to formaldehyde of about 1.0:1 to 1.5:1.

Generally the polyvinyl acetal contains the polyvinyl (alcohol) portion in a weight ratio to the aldehyde portion within the range of from about 1:1 to 2:1, dependent to a large extent on actual hydroxyl content, and its effect on solubility of the polyvinyl acetal in the particular solvent during the manufacture of the coating material.

Although thickness of the resin coating product on the monofilament is largely dependent on the need at hand, it is generally within the range of from about 0.05 to 1 mil and more often from about 0.1 to 0.5 mil. Although a minimum coating thickness within the generally contemplated range is often sufficient for imparting suitable bonding of the filament to the epoxy resin matrix, a greater thickness within that range is often utilized to provide the spacing sought between the unidirectional and parallel disposed monofilaments during mandrel winding into the epoxy matrix. Thus, although a resin coating of the invention having a thickness of about 0.05 mil is generally sufficient to provide strong bonding of resin to filament, it is generally preferred that the monofilaments be spaced in the matrix by a distance of from about 0.2 to 0.8 mil to prevent frictional wear and local stress concentration points and hence to promote good load transfer. Accordingly, in those instances, a coating thickness in the range of from 0.1 to 0.4 mil is often advantageously utilized.

The resin coating material bonded to the boron monofilament, in practice of the invention is uniformly and firmly bondable to any suitable expoxide type matrix utilized in filament winding. These epoxy resin matrix materials are well known in the art and are of the two well known types, viz., the bis-phenol-epichlorohydrin and the bis-(epoxycyclopentyl)ether types; the bis-phenol epichlorohydrin type generally having a molecular weight within the range of 280–12,000 (140–6000 epoxy equiv.), preferably in the range of 280–600 (140–300 epoxy equiv.), and the bis-(epoxycyclopentyl)ether type generally having a molecular weight within the range of about 180–1000 (90–500 epoxy equiv.), preferably in the range of 180–700 (90–375 epoxy equiv.).

The body of phenol-acetal coating resin with which the boron filament is contacted is a solution of the polyvinyl acetal and phenolic resin ingredients in a selected liquid solvent system. Although the weight ratio of phenolic resin to acetal resin in the liquid body of coating resin is within the range of from 0.25:1 to 18:1, it is more often within the range of about 1:1 to 4:1. In preferred practice, the liquid body of coating resin is a solution of the resin ingredients, formed by admixing separate solutions of the phenolic and acetal resin components, and the weight ratio of phenolic resin to polyvinyl acetal resin in the coating solution is within the range of from 1:1 to 4:1. The choice of solvent for each solution of resin component is determined by the requirements of the particular acetal and phenolic resin, not only in respect of solubility but also with reference to viscosity of the resulting solution and ease in which the residual solvent can be removed from the wet coating after the wet layer has been emplaced on the filament surface. For example, polyvinyl formal is not soluble in 95 percent ethanol, or in toluene, but it is soluble in a 40–60 respectively weight blend of those solvents; a 40–60 weight blend of n-butanol-xylene is a suitable solvent, although xylene is less volatile than toluene and hence requires higher temperature for removal from the resin coating prior to partial cure of the resin. Further exemplary of suitable solvents for polyvinyl acetal to form a polyvinyl acetal solution for mixing with the phenolic resin solutions are ethanol-xylene (60–40), diacetone alcohol-n-butanol-ethanol-xylene (20–20–20–40), diacetone alcohol-Cellosolve-n-butanol-ethanol - toluene(10–10–20–20–40), xylene-toluene-ethanol (20–20–60), and ethyl lactate-toluene-ethanol (20–40–40). Ethyl lactate is a now preferred solvent for the phenolic resin inasmuch as it prevents blushing and appears to promote wetting action of the coating action on the monofilament.

After blending the separate resin solution formulations, the resulting blend may be unclear which often denotes incomplete solution of solubles. In that event, addition of an auxiliary solvent to the resulting blend is often advantageous, for example, from 1 to 10 volume percent of methylethyl ketone. Other suitable auxiliary solvents include for example acetone, n-butanone, diisopropyl ketone, methyl isopropyl ketone, dioxane, diacetone alcohol, and methyl Cellosolve.

The final coating solution, or blend, formed by mixing the separate phenolic and polyvinyl acetal resin solutions, and auxiliary solvent, if any, is generally formed as a concentrate for dilution just prior to use in the coating step. The concentrate is often advantageous from the standpoint of minimum volume of blend to be stored and otherwise handled prior to need. The degree of dilution, if dilution is utilized, is determined by method of contacting the blend, e.g. by dipping, or as illustrated with reference to the drawings. Dilution is of most significance when it is utilized to regulate viscosity to in turn facilitate control of coating thickness at the desired value.

As a concentrate, the total phenolic and polyvinyl resin content thereof is generally within the range of from 15 to 20 weight percent; and often the concentrate is diluted, for actual use in the filament coating step, with a stock solution which is preferably the same composition as the total solvent initially introduced into the blend, to reduce the total resin content to within the range of from 7 to 15 weight percent.

In a preferred embodiment of manufacture of boron monofilaments of the invention, the bare boron filament is drawn successively through (1) a solution of the phenolic resin-polyvinyl acetal resin ingredients in a suitable solvent, at a rate providing for the requisite wetting of the filament surface to take place, (2) an aperture of predetermined cross-section smaller than that of the wetted filament to limit the cross-section of the wetted filament emerging therefrom to that of the aperture, and hence to regulate thickness of the solution layer, (3) an evaporation zone, at about ambient temperature, say 70–90° F. to permit evaporation of at least a most volatile portion of the solvent, (4) a heating zone for evaporative removal of residual solvent and for effecting a predetermined degree of partial cure of the residual resin to bond the resin to the boron filament surface, and then (5) onto a receiving drum for storage, generally to await winding on a mandrel into an epoxy resin type matrix to form a mat as broad goods product.

Figure 2:
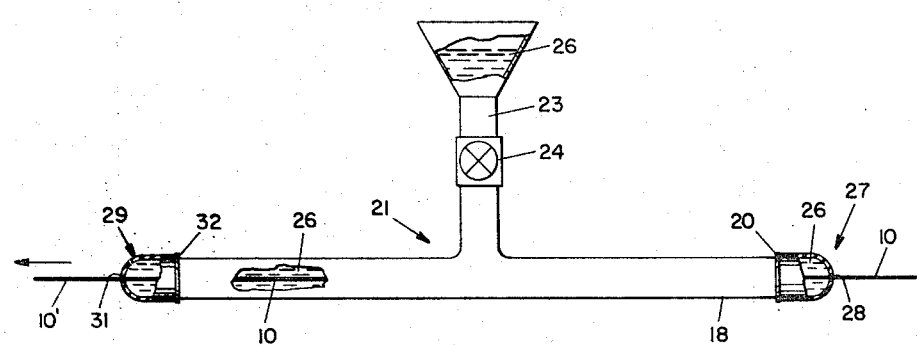
Figure 3:
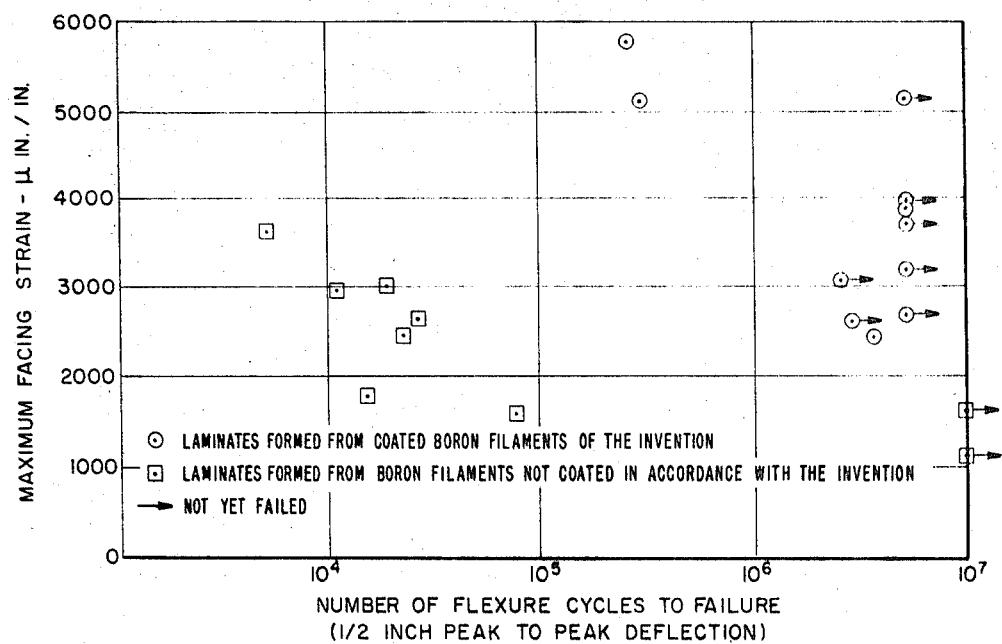

The invention is further illustrated with reference to the drawings of which FIG. 1 is a schematic flow sheet of now-preferred process for manufacture of coated filaments of the invention; and FIG. 2 illustrates a wetting mechanism for wetting the boron filament in the process of FIG. 1; and FIG. 3 is a graph of data demonstrating unexpected characteristics of broad goods of the invention.

Referring to FIG. 1, a bare strand of boron filament 10, prepared by vapor deposition of boron, at a layer thickness of from about 3 to 5 mils, on tungsten wire of diameter from about 0.1 to 0.2 mil, is drawn from supply spool 11 successively through resin solution contacting zone 12, solvent evaporation zone 13, partial curing zone 16 and then onto receiving drum 17. Zone 12, containing a resin solution comprises any suitable means by which contact of the boron filament with the resin solution can be accomplished to obtain a solution layer, on the filament, of uniform and predetermined thickness. A now-preferred contacting system 12 is that of FIG. 2 described hereinafter, including orifice means for guiding the monofilament through the solution and regulating the thickness of the solution layer on the emerging filament.

Bare monofilament 10 is drawn fully extended in substantially a straight line through the solvent solution of resin in zone 12, in immersion contact therewith at ambient temperature, say, 70–90° F., at a rate providing for the filament surface to become completely wetted by the resin solution. The rate of travel of filament 10 through the resin solution in zone 12, and hence contact time, is dependent upon the resin solution composition and particularly the solids content thereof, viscosity, and temperature to the extent that it affects viscosity. By way of example, rate of travel of filament 10 through contact zone 12 is generally advantageous at about 70–100 ft./min., when the solids content of the resin solution is in the order of about 5–20 weight percent. At a solids content above about 20 weight percent, wetting action is often unduly slow, and in many instances incomplete, leading to unsatisfactory bonding of the partially cured resin coating to the boron filament. In preferred practice, the solids content of the coating solution in zone 12 is within the range of from about 7–20 percent, often from about 7–15 percent.

The resin solution in zone 12 is, in preferred practice, prepared by first forming two separate resin component solutions as above described and admixing the resulting solutions to provide a resin solution concentrate which is then diluted, when desired, with a suitable auxiliary stock solution, or solvent. A now-preferred preparative embodiment for the resin concentrate solution comprises forming the two separate solutions, A and B, in accordance with the following formulations, and then admixing them to form the resulting blend as a concentrate described hereinabove;

| Formulation A: | Parts by weight |
|---|---|
| Polyvinyl acetal | 1–16 |
| Solvent [1] | 68–60 |
| Formulation B: | Parts by weight |
| Phenolic resin | 19–4 |
| Ethyl lactate [2] | 12–20 |

[1] Choice of solvent as discussed hereinabove.
[2] Preferred, to prevent blushing and to promote complete wetting of the filament by the resin solution. Ethyl lactate appears to function as a plasticizer for the polyvinyl acetal and/or the phenolic resins so that the solids are "extended" to a true "film" coating on the filament. In the absence of ethyl lactate, i.e. when utilizing a solvent in place thereof, some of the polyvinyl acetate is often precipitated on the boron as finely divided solid particles, generally in substantially colloidal form which is observed as "blushing."

The resulting blend, formulations $A+B$, may be unclear, which often denotes incomplete solution of solubles; and in that event it is generally advantageous to add an auxiliary solvent, e.g., methyl ethyl ketone in an amount of from 1 to 15 volume percent of the resulting blend, to provide for complete solution of the resin ingredients in the blend.

Prior to use in zone 12, as the resin solution, the concentrate (blend of formulations A and B) is diluted with suitable stock solution or solvent, it being the resulting diluted solution that then constitutes the resin solution in zone 12. Thus, by way of example, in terms of parts by weight, formulation A can be polyvinyl formal, 4.94; toluene, 49.56; and 95 percent ethanol, 19.28; and formulation B can be a phenol-formaldehyde, 12.86; and ethyl lactate, 12.86. Formulation A is a clear viscous solution formed by admixing the polyvinyl formal, ethanol, and toluene ingredients with continuous agitation for 4–6 hours on a roller mill at ambient temperature. Formulation B is merely a solution of the phenol-formaldehyde resin in ethyl lactate. The resulting blend of formulations A and B is somewhat unclear, and is brought to a clear homogeneous solution by the addition of about 10 cc. of methylethyl ketone. The resulting concentrate, prior to use as the resin solution in the contacting step in zone 12, is diluted with about equal parts by weight of a stock solvent, comprising on a weight percent basis toluene, 51; 95 percent ethanol 20, ethyl lactate 13; and methylethyl ketone, 16. In all events the phenolic resin to polyvinyl acetal weight ratio in the final resin solution, ready for use in zone 12 is 0.25:1 to 18:1.

Upon completion of contact of filament with resin solution in zone 12, the wetted filament is drawn from zone 12 through an exit orifice, further illustrated with reference to FIG. 2, which is of selected cross-section to permit passage therethrough of the filament and the wetting layer of solution thereon of predetermined thickness, but to turn back or, in effect, peel off the remaining and outermost portion of the wet layer to thereby provide a residual wet filament layer of uniform and predetermined thickness. Thus, when coating a boron filament, which is substantially of circular cross-section, in zone 12, utilizing the resin solution specifically illustrated above, and a coating of dry resin of about 0.1 mil thickness is sought, an orifice of circular cross-section of about 0.3 to 0.4 mil is advantageously utilized to maintain the thickness of the coated liquid to the desired value.

Uniformly wetted filament is drawn from zone 12 generally through the exit orifice not yet illustrated, into zone 13 wherein it is contacted with a stream of air at ambient temperature, say, 70–80° F. for removal of the more volatile solvent components such as ethanol of an ethanol-toluene solvent and some proportions of any higher boiling component, e.g. toluene of that solvent. Solvent removal in zone 13 is accomplished largely by evaporation, although by mechanical means to a lesser degree.

Filament 10, thus uniformly covered with residual solution of resin, is drawn from zone 13 into zone 16 in contact therein with a stream of heated air for effecting evaporative removal of all residual solvent; and to effect partial cure of the residual dry resin coating at least sufficiently to free the coating from tackiness. At this point there has been sufficient heating of the coated filament for reaction of the polyvinyl acetal and the phenolic resin to split out water and form resulting partial bonds between the polyvinyl acetal and the phenolic resin.

Any suitable air stream temperature conditions can be utilized in zone 16 for effecting the desired solvent removal and partial cure. Generally, the temperature in zone 16 is within the range of about 200–500° F. under time conditions of from 1–20 seconds, and more often, a temperature within the range of from 240–350° F. for a period of from about 2–8 seconds. Thus, by way of example, effecting removal of residual solvent from the filament coating and effecting desired partial cure of same in a stream of hot air in zone 16 at a temperature of 400° F. is generally correlated with a residence time in the order of from 1–2 seconds whereas at a temperature in the order of 200° F., residence time is correspondingly longer, as for example, from about 10–20 seconds. Although temperature in zone 16 can generally be selected from the above ranges and correlated with time, temperatures at upper levels in these ranges may in some instances lead to blistering of the partially cured coating, regardless of the short time utilized.

Filament with resulting partially cured resin coating is drawn from zone 16 onto receiving drum 17.

Referring to FIG. 2, an exemplary system 21, utilizable as the entire mechanism for carrying out the filament-solution contacting in zone 12 of FIG. 1, comprises a tube 18, for example about 10 inches in length and about 8 mm. I.D. with resin solution supply 23 connecting through valve 24 with the interior of tube 18 at about midway thereof, for delivery of resin solution 26 into tube 18.

Closure member 27, with orifice 28, at the end 20 of tube 18 for receiving filament 10 for withdrawal through tube 18, as a straight monofilament, is of any suitable size for support and guidance of filament 10 through tube 18 in contact with resin solution 26 substantially filling the bore of tube 18. Orifice 28 is preferably of cross-sectional dimension only slightly greater than that of filament 10 so as to serve to effectively guide filament 10 along a substantially axial path of travel through tube 18 and also provide sufficient closure for tube 18 to preclude flow of resin solution from the filament inlet end thereof. Any suitable orifice structure can be utilized, a closure 27 formed of suitable plastic and containing an aperture, or passageway, extending in substantial axial alignment with tube 18 being often utilized.

Exit aperture assembly 29 at the end 32 of tube 18, opposite closure assembly 27, contains aperture 31 adapted to guide resulting wet filament 10' from its axial travel in tube 18, at a predetermined thickness of wet solution layer thereon. Exit aperture assembly 29 is advantageously a rubber cap member secured to the exit end 32 of tube 18. Exit aperture 31 is of cross-sectional dimension sufficient to permit the wetted filament 10' of predetermined solution layer thickness to be drawn therethrough but serves to dam, or reject passage of, any excess solution layer. Thus, the wetted filament 10' drawn through orifice 31 is wetted with a layer of resin solution which contains the requisite amount of resin to provide for the dry and partially cured residual resin coating of predetermined thickness.

The apertures, of either of the closure members, can be formed in any manner such as by drilling an aperture of the requisite size through the closure member, or by punching a smaller than required opening through the closure, followed by adjusting it to the required size.

In operation of the coating assembly of FIG. 2, the filament is drawn through tube 18 substantially along the tube axis; and the length of the tube, volume of the coating solution, solids content of the solution, viscosity, and temperature are correlated to accomplish the required wetting action described with reference to FIG. 1.

Although now preferred process, as illustrated with reference to FIGS. 1 and 2, involves drawing the filament through the described treating zones, any suitable means for contacting the filament with the resin coating solution can be utilized such as by simply spraying the solution onto the filament surface, or by immersing or dipping the extended filament in the resin solution, and regulating contacting conditions to provide the requisite thickness of wetting layer. Solvent removal and subsequent partial cure can be accomplished, when desired, by maintaining the filament in a stationary position.

The invention is illustrated with reference to the following examples.

EXAMPLE 1

A polyvinyl acetal-phenolic resin coating composition of the invention was prepared from resin formulations A and B which were as follows:

Formulation A

| Component: | Grams |
| --- | --- |
| Polyvinyl formaldehyde | 2 |
| 95 percent ethanol | 8 |
| Toluene | 16 |

Formulation B

| Component: | Grams |
| --- | --- |
| Phenol formaldehyde (commercially available resin) | 4 |
| Ethyl lactate | 4 |

Twenty grams of the formulation A was mixed with the entire formulation B, and the resulting blend was a clear viscous liquid.

A coating of commercially available epoxy resin well known as a suitable matrix composition for filament winding, viz., an epoxy resin of the bis-phenol epichlorohydrin type containing methylbicyclo[2.2.1]heptene-2,3 - dicarboxylic anhydride as a curing agent, was applied to an aluminum metal sheet as layer of about 10 mil thickness covering an area of about 84 square centimeters, and the thus coated sheet was maintained at 400° F. for 4 hours under which conditions the epoxy resin layer underwent cure to form a resulting bond to the aluminum sheet. The entire resin blend, i.e. formed from formulations A and B as above described, was then uniformly applied as a coating of about 5 mil thickness onto the entire surface of the cured, and bonded, epoxy resin. The resin blend coating, thus applied to the epoxy resin, was air-dried for 3 minutes at room temperature and then cured at 400° F. for 20 minutes.

An area of resulting partially cured resin layer deposited on the aluminum sheet was then separated into small square sections by cutting through the two layers to the aluminum sheet and an adhesive tape was then applied, by pressing, to the cross patch area at the resin coating surface, i.e. superposed thereon in adhering relationship; and was then pulled upwardly and away from the resin coating surface, i.e. simulating a 90° peel test. The tape, thus pulled from the adhering contact with the coating, was free from any adhering coating portions, thus demonstrating the bonded relationship of the applied resin coating to the epoxy resin layer.

EXAMPLE 2

The entire test of Example 1 was repeated except that formulation B consisted of 60 grams of the phenolic resin dissolved in 50 grams of ethyl lactate, the weight ratio of phenolic resin to polyvinyl formaldehyde being 38.9:1. A portion of the coating material, say, in the order of about 20–30 percent, adhered to the adhesive tape upon carrying out the peel test, thus indicating unsatisfactory bonding between the coating and the resin layers. This example demonstrates the criticality of the weight ratio of phenolic resin to polyvinyl acetal required, the weight ratio in the present instance being outside that required in practice of the invention.

EXAMPLE 3

The entire test of Example 1 was repeated except that the formulation A was omitted from the coating composition. The formulation B, thus forming the coating on the epoxy layer, was added in an amount to proxide a resin coating layer of about the same thickness as that of Example 1. In the order of 50–70 percent of the coating material adhered to the tape after the peel test, thus demonstrating that the phenolic resin, alone, cannot function as a coating in accordance with the invention.

EXAMPLE 4

A liquid coating mechanism of FIG. 2 was filled with a resin solution of formulations A and B of Example 1. The tube of the coating assembly, see tube 18 of FIG. 2, was 10 inches in length x 0.31 inch I.D., orifice to orifice, and was charged with about 12 ml. of the resin solution. An etched boron monofilament was drawn lengthwise, and axially in tube 18, through the resin solution, at 100 ft. per minute at ambient temperature, which was at about 75° F.; the boron monofilament constituted boron vapor, formed by reduction of boron trichloride, deposited on 0.1 to 0.2 mil diameter tungsten wire, at a boron layer thickness of about 4 mils.

The filament, completely wetted by resin solution was then drawn from contact with the resin solution in the contacting tube, through an evaporation zone wherein it was contacted with a stream of air at ambient temperature to remove the most volatile ingredients of the solvent system, viz., the ethanol and some of the toluene, and then through a furnace in contact therein with a stream of hot air at about 400° F. at a residence time of about 1.8 seconds. The filament, completely dried and the residual resin partially cured, in the furnace, was drawn therefrom and wound onto a receiving drum for storage.

It has been previously observed that when a resin coating of the invention is applied to a boron filament at a film thickness of about 0.1 to 0.4 mil, the filament, at its boron surface, is capable of dispersing light to form a brilliant rainbow of colors, under a miscroscope at 400X. The absence, weakness, or noncontinuity of color, on the filement surface, indicates the absence, or nonuniformity, of the resin coating, which in all events has a maximum thickness below 0.1 mil or alternatively, a minimum thickness above 0.4 mil. The presence of a rainbow of colors on the boron filament surface, at that magnification, therefore serves as a criterion for detecting the presence of a resin coating layer, and indicating the thickness and continuity thereof, i.e. whether the coating is of 0.1 to 0.4 mil thickness and uniformly and completely covers the boron filament.

The monofilament, coated and color tested as described, failed to show color and was adjudged to have been coated too heavily with the phenolic-polyvinyl acetal resin coating.

The above-described coating and curing procedure (this example) was repeated except that the coating-resin solution was diluted to 10 percent solids with additionally added toluene. A sample of the partially cured resin coated filament was color tested as above described, which showed the entire outer boron filament surface to be brilliantly multicolored and that the resin coating thickness was about 0.2 mil and was continuous about the entire filament surface.

This example demonstrates the effect of the variation of concentration of solids in the resin coating solution, and illustrates an embodiment in which dilution of the resin solution is required in order to facilitate uniformity of resin coating at the desired degree of thickness.

EXAMPLE 5

A resin coating solution was prepared by forming and then admixing polyvinyl acetal and phenolic resin solutions in accordance with the following formulations:

Formulation A

| Component: | Grams |
|---|---|
| Polyvinyl formaldehyde | 4.94 |
| 95 percent ethanol | 19.78 |
| Toluene | 49.56 |

Formulation B

| Component: | Grams |
|---|---|
| Phenol formaldehyde (commercially available resin) | 12.86 |
| Ethyl lactate | 12.86 |

Upon mixing formulations A and B a two-phase (cloudy) system resulted. The solution was clarified by addition thereto of about 20 cc. of methylethyl ketone (MEK). The resulting solution viscosity was 60 cps. when measured with Brookfield spindle No. 4 at 30 r.p.m. at 75° F. Total solids content of the resin solution was 17.8 percent with a phenolic resin to polyvinyl formal resin weight ratio of 2.6:1.

In accordance with the process of FIG. 1, a boron monofilament formed by boron vapor deposition on tungsten wire, as described in Example 4, was drawn through a body of the thus prepared resin solution, contained within a solution contacting zone (10 inches in length by 8 mm. I.D. of FIG. 1), at a rate of 100 ft./min. at ambient room temperature, and then from the contacting zone through an exit orifice. The filament as result of contact with resin solution in the coating zone was wetted and coated substantially about its entire surface, with a layer of resin solution of varying thickness in the order of from 0.6 to 1.0 mil. The exit orifice had a diameter of 0.4 mil under which conditions the thickness of the wetting layer was confined to substantially about 0.4 mil. The wetted filament, having passed through the exit orifice was drawn through a drying zone in contact with a stream of air at about 75° F. to evaporatively remove the most volatile of the solvent system, under which conditions substantially all of the ethanol solvent, and a small proportion of the toluene and ethyl lactate was removed. The filament thus free from a portion of the resin solvent, i.e. wetted with residual solution, was then drawn through a hot air chamber in contact with a stream of air at 150–160° F. for a residence time of about 2 seconds to initially remove all residual solvent and then impart sufficient degree of partial cure to the resin coating to cause it to dry and exhibit the requisite affinity for the boron filament. The resulting filament, with partially cured resin coating, was then drawn from the heating furnace and wound onto the receiving drum for storage. Microscopic observation of a surface of a specimen of the thus coated filament showed a brilliant rainbow of colors on the entire filament surface, and that accordingly the filament surface was completely and uniformly coated with the resin at a coating thickness of about 0.2 mil. The example further illustrates that at the total solids content (17.8 percent) of the concentrate, no dilution was necessary.

Winding speed, i.e. rate of winding of the coated filament onto the recovery drum may at times, dependent on the particular system, be unduly high as to cause entrainment of air by the liquid coating material and impairment of bonding action and coat integrity. It is therefore advantageous to regulate the length of the contacting zone to permit the requisite residence time for resin coating the filament therein, at a constant and suitable winding rate precluding our entrainment, i.e. instead of varying winding rate in conjunction with a constant length of coating zone.

EXAMPLE 6

Several laminates of boron broad goods were prepared by mandrel winding resin-coated boron filaments of the invention into an epoxy resin matrix, forming the resulting mat product into laminates, and curing the resulting laminate in accordance with standard practice. The laminates were then tested for resistance to failure (flexure cycles to failure) at maximum facing strain levels of from 1000–5000 micro inches per inch. Several similar laminates, made from boron monofilament not coated with the resin of the invention, were tested in the same manner. The laminates prepared from the coated filaments of the invention were formed by winding a single layer of coated boron filament at an angle of about 89° (level winds) at room temperature (72° F.). The filaments were laid in uniplanular, unidirectional and parallel relationship on an epoxy matrix with a mechanical advance set to provide a minimum spacing of 0.2 mil between fibers. The resin coating thickness in the range of 0.1 to 0.2 mil guaranteed a fiber to fiber spacing of 0.2 to 0.4 mil. The matrix was a blend of bisphenol-epichlorohydrin type epoxy resin and dicyandiamide in film form, activated by heat to form a cross-linked resin system. The resin matrix was then heated at 150° F. to cause the resin to soften and flow around each coated boron filament. The heating period was 30 minutes which was sufficient to encapsulate the fibers in the matrix. The resulting mat contained about 216 fibers per inch.

The broad goods mat thus formed was cut into small rectangles (3" x 4.5") which were superimposed one upon another with the fibers all oriented in the same direction. About 24 plies of mat were stacked to form a compressed laminate ⅛" thick. Curing of the resulting panel, or laminate, was carried out in three steps under low pressure (50 p.s.i.) at (a) 180° F. for 30 minutes, (b) 285° F. for 30 minutes and (c) 340° F. for 60 minutes. The finished laminate was allowed to cool to ambient temperature before removing from the press, and test strips (4.5" x ½") were cut from the laminate.

The results of the tests are shown with reference to FIG. 3. The term "Maximum Facing Strain" ($\mu$in./in.) is utilized in the art to designate the flexure of beam, i.e. strain C=stress $\omega$/modulus E; and theart refers to the term "Flexure Cycles to Failure" to designate the number of times the beam is deflected and returned to a no-strain condition before it breaks.

As shown at FIG. 3 the laminates formed from the resin coated boron filaments of the invention resisted failure at high strain levels (above 300 $\mu$in./in.) for $10^7$ cycles. In contrast, the other laminates could not be maintained at stress levels higher than 3000 $\mu$in./in. even for as few as $10^4$ and $10^5$ cycles of flexure at low strain levels, and only two of the latter at very low strain level were still flexing after $10^7$ cycles. These tests demonstrate superior performance of coated boron filaments of the invention and laminates made therefrom.

EXAMPLE 7

Mechanical property data for boron laminate panels formed by mandrel winding coated boron filaments of the invention into an epoxy resin type matrix, and then laminating the mats and curing the laminate to form corresponding broad goods products, were tested for various properties, as summarized in the following table. The data show that the values observed for the resulting broad goods product were significantly superior to those of design performance specifications of the same laminates, except that the latter are prepared from corresponding uncoated boron monofilaments. The improvement is attributable to the coating resin as a medium for chemical bonding of the boron filament and matrix and to the uniformity in spacings accomplished between filaments during the winding, i.e. due to the uniformity of coating thickness.

TABLE 1.—Mechanical properties of boron/epoxy laminates [1] using coated boron filaments

| | Coated filament direction, degrees | No. of plies [2] | Minimum required by specifications | Observed |
|---|---|---|---|---|
| Tensile strength (p.s.i.) | 0 | 7 | 225,000 | 235,000 |
| | ±45 | 6 | 20,000 | 30,000 |
| Compressive strength (p.s.i. [3]) | 0 | 24 | 150,000 | 155,000 |
| Flex strength (p.s.i.) [4] | 0 | 24 | 200,000 | 285,000 |
| | 0 | 24 | 15,000 | 16,000 |
| Horizontal shear (p.s.i.) [5] | ±45 | 17 | 5,000 | 8,500 |
| Transverse shear (p.s.i.) [5] | 90 | 6 | 8,000 | 9,000 |

[1] A laminate is formed from two or more mat layers.
[2] A single ply is a layer of mat formed by filament winding.
[3] Load (lbs.)/cross-sectional area (in. [2]).
[4] 3 PL/2 wt [2].
[5] 3 P/4 wt.

NOTE.—P=load, L=length of specimen, w=width of specimen, t=thickness of specimen.

EXAMPLE 8

Several polyvinyl formal-phenol formaldehyde resin solutions, of varying phenolic to polyvinyl formal weight ratios, were prepared in accordance with the procedure of Example 5. In one series of tests, a sample of each solution was brushed onto a cured surface of epoxy resin which was bonded onto an aluminum sheet as illustrated in Example 1. In another series of tests a set of bare boron filaments, prepared as described in Example 5 were dipped into, and then removed from, a portion of each of the resin solutions. The thus coated panels and coated filaments were dried, and then cured at 300° F. for 1 hour, and the resin coating of each had, in all instances, a thickness of 2–5 mils. The adhesive tape test (Example 1) was applied to all cured panel samples and the color test (Example 5) was applied to all coated filament samples—both tests described hereinabove. Data summarizing preparation of the samples, and results of the tests are tabluated as follows:

TABLE 2

| | Preparation of coating solution, grams | | | | | Bonding of partially cured resin | | Dry resin coating, percent | |
|---|---|---|---|---|---|---|---|---|---|
| | 40/60 ethanol-toluene | Ethyl lactate | MEK | Phenolic resin* | Polyvinyl formal | To the filament | To the panel | Phenolic resin* | Polyvinyl formal |
| Test: | | | | | | | | | |
| 1 | 9.3 | 2 | 0 | 0.0 | 0.67 | Failure | Failure | 0 | 100 |
| 2 | 63 | 2 | 0 | 0.26 | 5 | ...do... | ...do... | 5 | 95 |
| 3 | 63 | 2 | 0 | 0.5 | 4.5 | ...do... | ...do... | 10 | 90 |
| 4 | 56 | 3 | 0 | 1 | 4 | Good | Excellent | 20 | 80 |
| 5 | 42 | 3 | 0 | 1 | 3 | ...do... | ...do... | 25 | 75 |
| 6 | 28 | 6 | 0 | 2 | 2 | Excellent | ...do... | 50 | 50 |
| 7 | 28.5 | 4 | 0 | 4 | 1.5 | ...do... | ...do... | 72.2 | 27.8 |
| 8 | 35 | 12 | 0 | 7.5 | 2.75 | ...do... | ...do... | 75 | 25 |
| 9 | 28 | 6 | 5 | 8 | 2 | Good | ...do... | 80 | 20 |
| 10 | 28 | 10 | 0 | 18 | 2 | ...do... | ...do... | 90 | 10 |
| 11 | 4 | 15 | 0 | 5 | 0.275 | ...do... | ...do... | 94.74 | 5.26 |
| 12 | 28.5 | 50 | 0 | 60 | 1.5 | Failure | Failure | 97.6 | 2.4 |
| 13 | 28 | 0 | 0 | 8 | 0.0 | ...do... | ...do... | 100 | 0 |

*Phenol formaldehyde (phenol:formaldehyde, 1.5:1).

These tests show that a resin solution of phenolic resin alone or polyvinyl formal alone is inoperable to provide a suitable bond of the coating resin to either the epoxy resin or the boron monofilament. The tests further demonstrate ratios of the two coating resin solution components also inoperable in practice of the invention. Further, these tests show the operable range of phenolic to polyvinyl acetal weight ratios to be from 0.25:1 to 18:1 for polyvinyl formal and phenol formaldehyde resin ingredients which range of ratios is applicable to all resin solutions, and hence resin coatings, in preferred, practice of the invention.

The coated filaments of the invention are characterized by improved toughness which permits handling and processing of the filaments without abrasion or breakage and contraction of the laminates; and the laminates made from the coated filaments of the invention have fewer voids as a direct result of improved wetting of the filaments by the epoxy resin matrix, through the resin coating as a chemical bonding medium.

By way of further illustration of the invention, a broad goods product is formed into laminated mats such as above described, from mats ranging in number of from 3 to 50, at pressures of from 50 to 100 p.s.i., temperatures from 180 to 350 and for times of from 30 to 60 minutes; in accordance with well-known prior art procedures. Individual mats of typical broad goods product of the invention are formed from boron filaments having a resin coating thickness of from 0.1 to 0.4 mil to provide a spacing of boron filament of from 0.2 to 0.8 mil.

When referring herein to partial degree of cure of the epoxy resin matrix, it is to be understood that the presence in the epoxy resins of well known epoxy resin curing agents, or curing catalysts, is contemplated.

As will be evident to those skilled in the art, various modifications can be made or followed, in the light of the foregoing disclosure and discussion, without departing from the spirit or scope of the disclosure or from the scope of the claims.

What I claim and desire to protect by Letters Patent is:

1. An improved filamentary material comprising a boron filament, and a resin material uniformly, and completely, covering said filament as a coating therefor; said resin material consisting essentially of a mixture of a phenolic aldehyde resin and a polyvinyl acetal resin in a weight ratio of said phenolic to said acetal within the range of from 0.25:1 to 18:1, and bonded to said filament in state of partial cure.

2. A filamentary material of claim 1 wherein said ratio of phenolic to acetal is within the range of from 1:1 to 4:1.

3. A filamentary material of claim 1 wherein said phenolic resin is a phenol-formaldehyde, and said polyvinyl acetal resin is a polyvinylformal.

4. A filamentary material of claim 3 wherein the ratio of phenol to formaldehyde groups in said phenol formaldehyde resin is within the range of from 1:1 to 1.5:1; and the ratio of polyvinyl groups to formaldehyde groups in said polyvinylformal resin is within the range of from 1:1 to 2:1.

5. A filamentary material of claim 4 wherein said boron filament comprises a metal fiber, and a layer of elemental boron completely covering said fiber.

6. A filamentary material of claim 4 wherein the thickness of said resin coating is within the range of from 0.05 to 1 mil.

7. A filamentary material of claim 6 wherein said boron filament comprises a bare tungsten wire of from 0.1 to 0.2 mil diameter, and a layer of elemental boron covering said bare wire as a complete coating therefor; and the thickness of said resin coating is within the range of from 0.1 to 0.5 mil.

8. A process for the manufacture of boron filaments exhibiting improved bondability to matrices of the epoxy resin type, comprising contacting a boron filament with a solvent solution of phenolic aldehyde resin and polyvinyl acetal resin containing said phenolic in a weight ratio to said acetal within the range of from about 0.25:1 to 18:1, to wet said filament in its entirety with said solution; removing said filament from contact with said solution, and said filament thus removed being completely covered with a layer of said solution; adjusting the thickness of said solution layer on said filament, to a predetermined, substantially constant value; subjecting the resulting layer-covered filament to conditions for substantially completely removing solvent from said layer; and curing residual resin of said layer to a sufficiently partial degree to bond said residual resin to said filament as a solid coating therefor.

9. In a process of claim 8, drawing a boron filament successively through (1) said solution of said phenolic and acetal resin to wet the entire surface of said boron filament with said solution, and said solvent being removable from said layer by evaporation, (2) an aperture of predetermined cross-section, less than that of the resulting wetted filament, to adjust thickness of the resulting wetting layer on said filament to a predetermined value permitting emergence of said filament from said aperture, (3) an evaporation zone for evaporation of at least a portion of said solvent and (4) a heating zone for evaporative removal of any residual solvent from said solution layer and to effect said partial degree of cure of said residual resin.

10. A process of claim 9 wherein said solvent is a mixture of liquids of different volatilities, and a more volatile portion of said solvent is removed from said solution layer in said evaporative zone.

11. A process of claim 10 wherein said solvent is a mixture of ethyl lactate and a 40–60 respectively weight blend of 95 percent ethanol and toluene, and substantially all of said ethanol is removed from said solution layer in said evaporation zone.

12. A process of claim 11 wherein the total resin solids content of said solution is within the range of from 7–20 weight percent.

13. A process of claim 10 wherein the weight ratio of said phenolic resin to said polyvinyl acetal resin is within the range of from 1:1 to 4:1.

14. A process of claim 13 wherein the cross-sectional dimension of said aperture is sufficient to provide said coating of resin solution of depth to in turn provide a resulting partially cured resin coating on said filament having a thickness of from 0.05 to 1 mil.

15. A process of claim 13 wherein said filament is contacted in said evaporation zone with a stream of air at substantially ambient temperature, and is contacted in said heating zone with a stream of air at a temperature of from 200–500° F. for a period of from 1–20 seconds.

16. A process of claim 15 wherein said phenolic resin is a phenol-formaldehyde and said polyvinyl acetal resin is a polyvinyl-formal.

References Cited

UNITED STATES PATENTS

| 2,902,470 | 9/1959 | Kress | 260—47 |
|---|---|---|---|
| 3,508,963 | 4/1970 | Izumi et al. | 117—232 |
| 3,523,820 | 8/1970 | Sheffer | 117—218 |
| 2,917,416 | 12/1959 | Lavin et al. | 117—128.4X |
| 2,917,482 | 12/1959 | Lavin et al. | 117—128.4X |
| 3,442,834 | 5/1969 | Flowers et al. | 117—128.4X |
| 3,445,282 | 5/1969 | Olson et al. | 117—128.4X |
| 3,450,595 | 6/1969 | Salter et al. | 161—215 |
| 3,462,513 | 8/1969 | Fitzhugh et al. | 117—128.4X |
| 3,487,045 | 12/1969 | Shepard et al. | 161—215X |
| 3,489,701 | 1/1970 | Lee | 117—128.4X |
| 3,464,954 | 9/1969 | Tholstrup | 117—128.4X |

HAROLD ANSHER, Primary Examiner

U.S. Cl. X.R.

117—232, 161; 161—170, 182, 215, 257